(12) United States Patent
Feng et al.

(10) Patent No.: US 8,488,475 B2
(45) Date of Patent: Jul. 16, 2013

(54) FAULT PROCESSING METHOD, SYSTEM AND EXCHANGING DEVICE BASED ON INDUSTRY ETHERNET NETWORK

(75) Inventors: Dongqin Feng, Zhejiang (CN); Jian Chu, Zhejiang (CN); Han Zhang, Zhejiang (CN); Jianxiang Jin, Zhejiang (CN)

(73) Assignees: Supcon Group Co., Ltd., Hangzhou, Zhejiang Province (CN); Zhejiang University, Hangzhou, Zhejiang Province (CN)

( * ) Notice: Subject to any disclaimer, the term of this patent is extended or adjusted under 35 U.S.C. 154(b) by 514 days.

(21) Appl. No.: 12/744,296

(22) PCT Filed: Dec. 20, 2007

(86) PCT No.: PCT/CN2007/071280
§ 371 (c)(1),
(2), (4) Date: May 21, 2010

(87) PCT Pub. No.: WO2009/070943
PCT Pub. Date: Jun. 11, 2009

(65) Prior Publication Data
US 2010/0265820 A1    Oct. 21, 2010

(30) Foreign Application Priority Data
Nov. 26, 2007   (CN) .......................... 2007 1 0167374

(51) Int. Cl.
*H04J 3/14* (2006.01)
(52) U.S. Cl.
USPC ....................................................... 370/242
(58) Field of Classification Search
USPC ................... 370/229–258, 351–406
See application file for complete search history.

(56) References Cited

U.S. PATENT DOCUMENTS

| | | | |
|---|---|---|---|
| 5,737,316 A | * | 4/1998 | Lee ............................... 370/248 |
| 5,859,836 A | | 1/1999 | Eslambolchi |

(Continued)

FOREIGN PATENT DOCUMENTS

| | | |
|---|---|---|
| CN | 1585365 A | 2/2005 |
| CN | 1681254 A | 10/2005 |

(Continued)

OTHER PUBLICATIONS

Russian Official Action and English language translation from related Russian Application No. 2010126198/08(037402).

(Continued)

*Primary Examiner* — Kwang B Yao
*Assistant Examiner* — Juvena Loo
(74) *Attorney, Agent, or Firm* — Wolf, Greenfield & Sacks, P.C.

(57) ABSTRACT

A fault processing method based on industry Ethernet network, wherein exchanging devices in the network are connected by mutual redundant double links, wherein work link is in working state, the spare link is in spare state, and the method includes: detecting connection states of the double links between the exchanging devices in the network (201); switching the spare link to the work link when the work link is in fault state and the spare state is in connecting state (202). A fault processing system and exchanging device based on industry Ethernet network are further provided, which applies the ring structure of mutual redundant double links according to the invention, the network availability is ensured by switching to the spare link when multipoint faults appear in the network; and the time of fault recovery processing is reduced by switching between mutual redundant links.

12 Claims, 7 Drawing Sheets

U.S. PATENT DOCUMENTS

| | | | |
|---|---|---|---|
| 6,222,821 B1 | | 4/2001 | Sees et al. |
| 6,704,311 B1 | | 3/2004 | Chuah et al. |
| 6,826,158 B2 | * | 11/2004 | Seaman et al. ............ 370/254 |
| 7,003,705 B1 | * | 2/2006 | Yip et al. ................. 714/717 |
| 7,412,557 B2 | * | 8/2008 | Di Benedetto et al. ...... 710/316 |
| 7,957,267 B2 | * | 6/2011 | Sasagawa et al. ............ 370/216 |
| 8,004,961 B1 | * | 8/2011 | Buchanan et al. ............ 370/216 |
| 2004/0008721 A1 | * | 1/2004 | Ying et al. ................. 370/460 |
| 2005/0207348 A1 | * | 9/2005 | Tsurumi et al. ............ 370/241 |
| 2006/0250969 A1 | * | 11/2006 | Florit et al. ................. 370/241 |
| 2010/0135295 A1 | * | 6/2010 | Burney et al. ................. 370/390 |
| 2011/0317549 A1 | * | 12/2011 | Santos ........................ 370/225 |

FOREIGN PATENT DOCUMENTS

| | | | |
|---|---|---|---|
| CN | 1777137 | A | 5/2006 |
| CN | 1878085 | A | 12/2006 |
| CN | 1968156 | A | 5/2007 |
| CN | 101030901 | A | 9/2007 |
| CN | 101001165 | A | 10/2007 |
| CN | 101047487 | A | 10/2007 |
| EP | 1087573 | A2 * | 3/2001 |
| EP | 1 411 666 | A2 | 4/2004 |
| EP | 0822678 | | 11/2005 |
| GB | 2 423 447 | A | 8/2006 |
| JP | 01-298838 | | 12/1989 |
| JP | 2005065216 | A | 3/2005 |
| JP | 2006270169 | A | 10/2006 |
| JP | 2007142751 | A | 6/2007 |
| KR | 19980013073 | A | 4/1998 |
| KR | 20040033859 | A | 4/2004 |
| RU | 2201037 | C2 | 3/2003 |
| RU | 2304849 | C2 | 8/2007 |
| WO | WO 03/073704 | A1 | 9/2003 |
| WO | WO 2006/136997 | A1 | 12/2006 |

OTHER PUBLICATIONS

Russian Official Action, Decision on Grant, dated Dec. 20, 2007 and English language translation from related Russian Application No. 2010126198/07(037402).

Japanese Official Action dated May 29, 2012 and English language translation from related Japanese Application No. 2010-534341.

Korean Notice of Office Action dated Jun. 24, 2011 from related Korean Application 10-2010-7014048.

International Search Report dated Jul. 3, 2008 from corresponding International Application No. PCT/CN2007/071280.

* cited by examiner

400# FAULT PROCESSING METHOD, SYSTEM AND EXCHANGING DEVICE BASED ON INDUSTRY ETHERNET NETWORK

The present application claims the benefit of Chinese Patent Application No. 200710167374.2 filed with the Chinese Intellectual Property Office on Nov. 26, 2007, entitled "Fault Processing Method, System and Exchanging Device based on Industry Ethernet Network", which is incorporated herein by reference in its entirety.

TECHNICAL FIELD

The present invention relates to a technical field of industry Ethernet network, particularly to a fault processing method, system and an exchanging device based on industry Ethernet network.

BACKGROUND OF THE INVENTION

With the development of Ethernet network technology, the Ethernet network has been increasingly applied to industrial fields, and operation stability and benefit increase of industrial production require more on the availability of the industry Ethernet network in case of fault. In view of the requirement of high availability of the industry Ethernet network, the existing industry Ethernet network generally uses the master-slave ring network redundancy implementation mechanism which controls the operation of the whole network by a master exchanging device in the Ethernet network system to ensure that the whole network is available in the event that a fault occurs in a certain exchanging device in the Ethernet network. However, in the above master-slave ring redundancy implementation mechanism, the fault risk in the network are highly converged on the master exchanging device, such that the whole Ethernet network may be unavailable in the case that a fault occurs in the master exchanging device.

Figure 1:
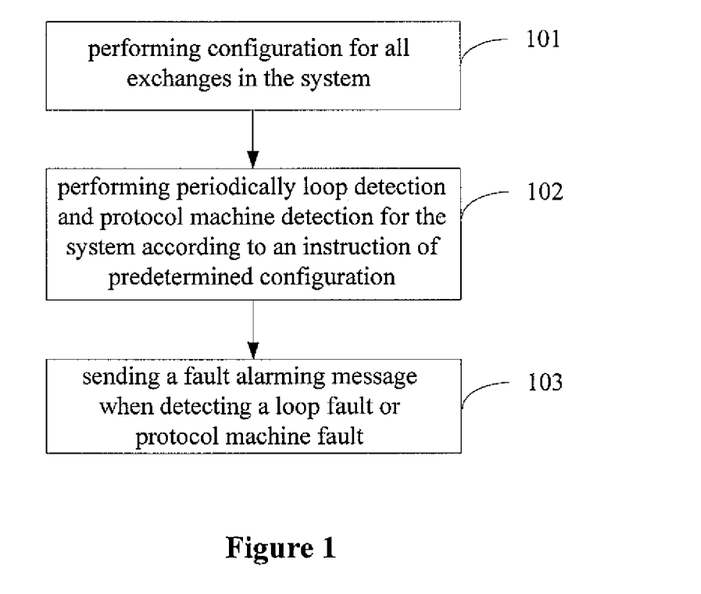
FIG. 1 is a flow chart of a fault processing method in the prior art.

In the prior art, in order to overcome the problem that the network will be unavailable in the event that a fault occurs in the master exchanging device in the master-slave ring network redundancy implementation mechanism, a distributed Ethernet network system is used, which includes a plurality of exchanges connected in sequence to form a ring structure. FIG. 1 illustrates a flow chart of implementing a fault processing by the system:

Step 101: performing configuration for all exchanges in the system.

Step 102: performing periodically loop detection and protocol machine detection for the system according to an instruction of predetermined configuration.

Step 103: sending a fault alarming message when detecting a loop fault or protocol machine fault.

It can be understood from the existing Ethernet network fault processing method that the method implements a distributed fault detection and diagnosis, indicates the principle of fairness in communication in the Ethernet network and solves the problem of highly converged risks of availability of Ethernet network resulted from a fault occurred in the master exchange device. However, in the case that a plurality of faults occur in a plurality of exchanging devices in the network, the Ethernet network system will be unavailable since the distributed single ring redundancy network can only process a fault occurred in a single exchanging device; and when a single fault occurs in the network, since a message transfer path in exchanging devices has been changed, the time of fault recovery of the Ethernet network is prolonged, and the availability of the Ethernet network is correspondingly decreased because an inherent FDB table in exchanging devices need to be reconstructed during fault recovery.

SUMMARY OF THE INVENTION

An object of the invention is to provide a fault processing method based on industry Ethernet network to solve the problem that the Ethernet network system will be unavailable when a plurality of faults occur in a plurality of exchanging devices in the prior art.

Another object of the invention is to provide a fault processing system and exchanging device based on industry Ethernet network to solve the problem that the system will be unavailable when a plurality of faults occur in a plurality of exchanging devices in the Ethernet network system in the prior art.

In order to solve the above technical problems, the invention provides the following technical solutions:

A fault processing method based on industry Ethernet network, wherein exchanging devices in the network are connected by mutual redundant double links, and wherein the work link is in working state, and the spare link is in spare state, the method comprising:

detecting connection states of the double links between the exchanging devices in the network; and switching the spare link to the work link when the work link is in fault state and the spare state is in connection state.

The connection state of the link include: the link in connection state, the link in fault state or the link in disconnection state.

The exchanging device includes at least four ports, and connects to an adjacent exchanging device thereof via two ports respectively; and two ports of the exchanging device in the same link are ports in the same ring, and two ports of the exchanging device connected to the same exchanging device are ports in the same direction.

Exchanging the spare link to the work link comprises the following steps:

searching, by the exchanging device, a port in the same direction with the fault port which makes the work link in fault state; and converting the state of the working port in the work link into forbidden state, and converting the state of the spare port in the spare link into the original state of the working port, when the spare link comprising the port in the same direction is in connection state.

The converting of the state of the spare port in the spare link into the original state of the working port includes:

the original state of the working port is forwarding state, and the state of the spare port is converted into forwarding state; or the original state of the working port is blocking state, and the state of the spare port is converted into blocking state.

The method further comprises:

maintaining, by the exchanging device, the state of the spare port in the spare link and converting the state of the fault port into blocking state, when fault occurs to both of the double links, or when the work link is in fault state and the spare link is in disconnection state; and informing the working port in blocking state in the network of conversion into forwarding state.

The method further comprises:

setting the state of the port in the double links according to predetermined configuration and performing clock synchronization when the exchanging device in the network is initialized.

The method further comprises:

sending, by the exchanging device, alarm information in a multicast manner when a fault occurs in the work link, wherein the alarming information includes information of fault type and position of the fault occurred.

A fault processing system based on industry Ethernet network, comprises: a plurality of exchanging devices connected by mutual redundant double links, wherein the work link is in working state, and the spare link is in spare state, wherein the exchanging device comprises:

a detection unit adapted to detect connection state of the double links between adjacent exchanging devices;

an exchanging unit adapted to switch the spare link to the work link when the work link is in fault state and the spare link is in connection state.

The switching unit comprises:

a searching unit adapted to search a port in the same direction with the fault port which makes the work link in fault state;

an operation unit adapted to convert the state of the working port in the work link into forbidden state and convert the state of the spare port in the spare link into original state of the working port, when the spare link comprising the port in the same direction is in connection state.

The exchanging device further comprises:

a converting unit adapted to maintain the state of the spare port in the spare link and convert the state of the fault port into blocking state when a fault occurs to both of the double links, or the work link is in fault state and the spare link is in disconnection state;

an informing unit adapted to inform the working port in blocking state in the network of conversion into a forwarding state.

The exchanging device further comprises:

a setting unit adapted to set the state of the port in the double links according to predetermined configuration and perform clock synchronization when the exchanging device in the network is initialized;

an alarming unit adapted to send alarming information in a multicast manner when a fault occurs in the work link, wherein the alarm information includes information of fault type and position of the fault occurred.

An exchanging device comprises:

a detection unit adapted to detect a connection state of the double links between the exchanging devices connected thereto;

a switching unit adapted to switch the spare link to the work link when the work link is in fault state and the spare link is in connection state.

The switching unit comprises:

a searching unit adapted to search a port in the same direction with the fault port which makes the work link in fault state;

an operation unit adapted to convert the state of the working port in the work link into a forbidden state and convert the state of the spare port in the spare link into the original state of the working port, when the spare link comprising the port in the same direction is in connection state.

The exchanging device further comprises:

a converting unit adapted to maintain the state of the spare port in the spare link and convert the state of the fault port into blocking state, when a fault occurs to both of the double links, or when the work link is in fault state and the spare link is in disconnection state;

an informing unit adapted to inform the working port in blocking state in the network of conversion into forwarding state.

The exchanging device further comprises:

a setting unit adapted to set the state of the ports in the double links according to predetermined configuration and perform clock synchronization when the exchanging device in the network is initialized;

an alarming unit adapted to send alarm information in a multicast manner when a fault occurs on the work link, wherein the alarm information includes information of fault type and position of the fault occurred.

It can be understood from the solutions provided in the invention, the exchanging devices in the network of the invention are connected by mutual redundant double links, wherein the work link is in working state; the spare link is in spare state; the connection state of the double links in the exchanging devices of the network is detected; the spare link is switched to the work link when the work link is in fault state and the spare state is in connection state. When a plurality of faults occur in the ring structure of mutual redundant double links in the invention, the network availability is ensured by switching to the spare link; and a re-direction time required by transmitting the normal data resulted from a change of the data transfer path during redundancy switching in a single ring network structure is avoided by switching in mutual redundant links, such that the time of fault recovery in the network is shortened.

DETAILED DESCRIPTION OF THE EMBODIMENTS

The core of the invention is to provide a fault processing method based on industry Ethernet network, and exchanging devices in the network are connected by mutual redundant double links, wherein the work link is in working state; the spare link is in spare state; the connection state of the double links between the exchanging devices in the network is detected; and the spare link is switched to the work link when the work link is in fault state and the spare state is in connection state.

In order to make those skilled in the art understand the technical solution of the invention, and make the objects, features and advantages of the invention obvious, the invention will be described in detail hereinafter with reference to the appended drawings and the embodiments.

Figure 2:
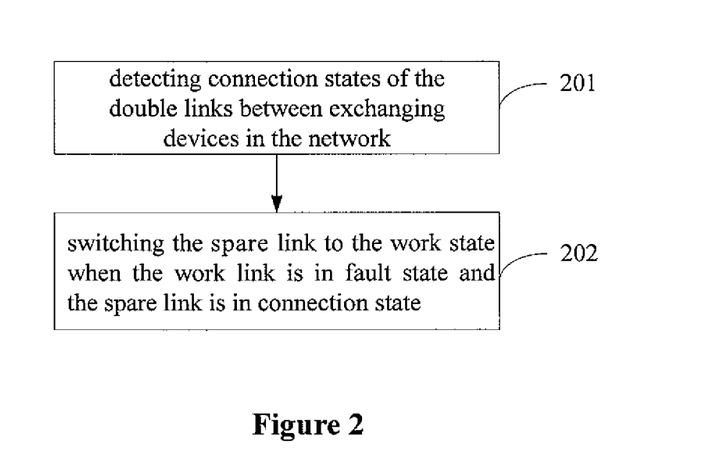
FIG. 2 is a flow chart of a fault processing method based on industry Ethernet network according to a first embodiment of the invention.

FIG. 2 illustrates a flow chart of a fault processing method based on industry Ethernet network according to a first embodiment of the invention. The exchanging devices in the industry Ethernet network are connected by mutual redundant double links, wherein the work link is in working state and the spare link is in spare state:

Step 201: detecting connection states of the double links between exchanging devices in the network.

Wherein the connection states of the link include the following: the link is in connection state, the link is in fault state or the link is in disconnection state. The port of the link in connection state defines that the connection of the link is normal based on the IEEE802.3 protocol, and a data exchanging can be normally implemented between adjacent exchanging devices via the port; the port of the link in disconnection state defines that the connection of link is in fault based on IEEE802.3 protocol, and no data exchanging can be performed via the port; and the port of the link in fault state defines that the connection of the link is normal based on IEEE802.3 protocol, but no data exchanging can be implemented between adjacent exchanging devices via the port since a fault occurred in the adjacent exchanging device.

Wherein each of the exchanging devices in the network includes at least four ports, and connects to the adjacent exchanging devices thereof via two ports respectively; two ports of the exchanging device in the same link are ports in the same ring, and two ports of the exchanging device connected to the same, exchanging device are ports in the same direction.

Step 202: exchanging the spare link to the work state when the work link is in fault state and the spare link is in connection state.

Specifically, the exchanging device searches a port in the same direction with the fault port which makes the work state in fault state; and converts the state of the working port in the work link into a forbidden state and converts the state of the spare port in the spare link into the original state of the working port when the spare link comprising the port in the same direction is in connection state. In the case that the original state of the working port is forwarding state, the state of the spare port is converted into forwarding state; and in the case that the original state of the working port is blocking state, the state of the spare port is converted as a blocking state.

Figure 3:
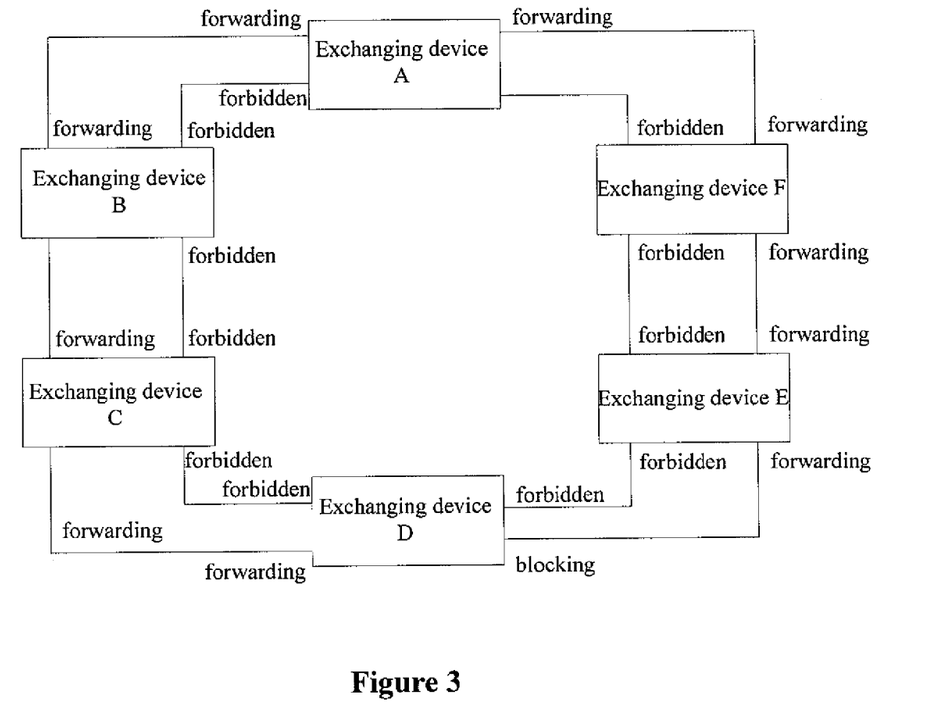
FIG. 3 is a schematic view of the state of the ports connected as double links between exchanging devices.

FIG. 3 illustrates a schematic view of the state of the port connected as double links structure between exchanging devices in the Ethernet network according to the invention:

FIG. 3 illustrates an exchanging device A, an exchanging device B, an exchanging device C, an exchanging device D, an exchanging device E and an exchanging device F mutually connected as a ring structure by double links. Ports in the same ring of all devices on an internal ring link are in forbidden state; ports in the same ring of the five exchanging devices except the exchanging device D on an external links are in forwarding state. Regarding two ports of the exchanging device D on the external ring, one is set in forwarding state, and the other is set in blocking state. Therefore, a loop will not be formed in the network in this setting manner to prevent a networking storm efficiently; and all ports in forbidden state in a corresponding internal ring link are spare ports, such that the internal ring link is the spare link of the external ring link acting as the work link.

In a double link structure of the Ethernet network according to the invention, during initializing the exchanging device, all ports in one ring are set in forbidden state, and one of all of the ports in the other ring is set in blocking state and the others are set in forwarding state according to the predetermined configuration. During initialization, the ports of the exchanging device perform clock synchronization and configuration functions of devices; the ports of the exchanging devices in forwarding state forward all the data message passing through the ports; the port of the exchanging devices in blocking state only sends connection detection request message and link detection response message between exchanging devices, and discards any other data messages; and the ports of the exchanging devices in forbidden state discard all data messages.

Figure 4:
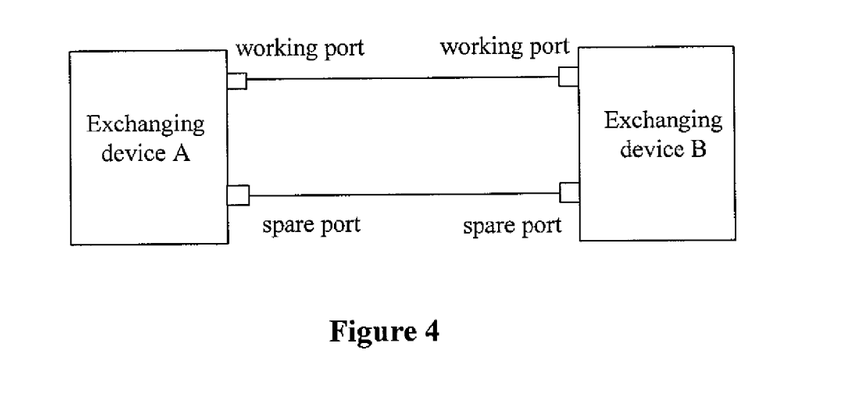
FIG. 4 is a schematic view of the connection of the ports between two exchanging devices according to the invention.

FIG. 4 illustrates a schematic view of the connection of the ports between exchanging devices according to the invention, which is taken in conjunction with the schematic view of the state of the ports connected as double links between exchanging devices:

The two exchanging devices are interconnected by two pairs of mutually redundant ports, wherein one pair of the ports interconnected are working ports, and the other pair of the ports interconnected are spare ports. When no fault occurs in the links between the two exchanging devices, the state of the working port in the ports in the same direction on each of the exchanging devices is in forwarding state or blocking state, and the spare port in the ports in the same direction is in forbidden state. The port in forwarding state will forward all of the data on the ports; the port in blocking state only sends a connection detection request message and a connection detection response message between the two exchanging devices, and discards any other data messages; and the ports in forbidden state does not forward any data. When the port in forwarding state detects a connection fault, the exchanging device can switch the working port to keep normal data communication when occurring a fault in the work link of the exchanging device.

Figure 5:
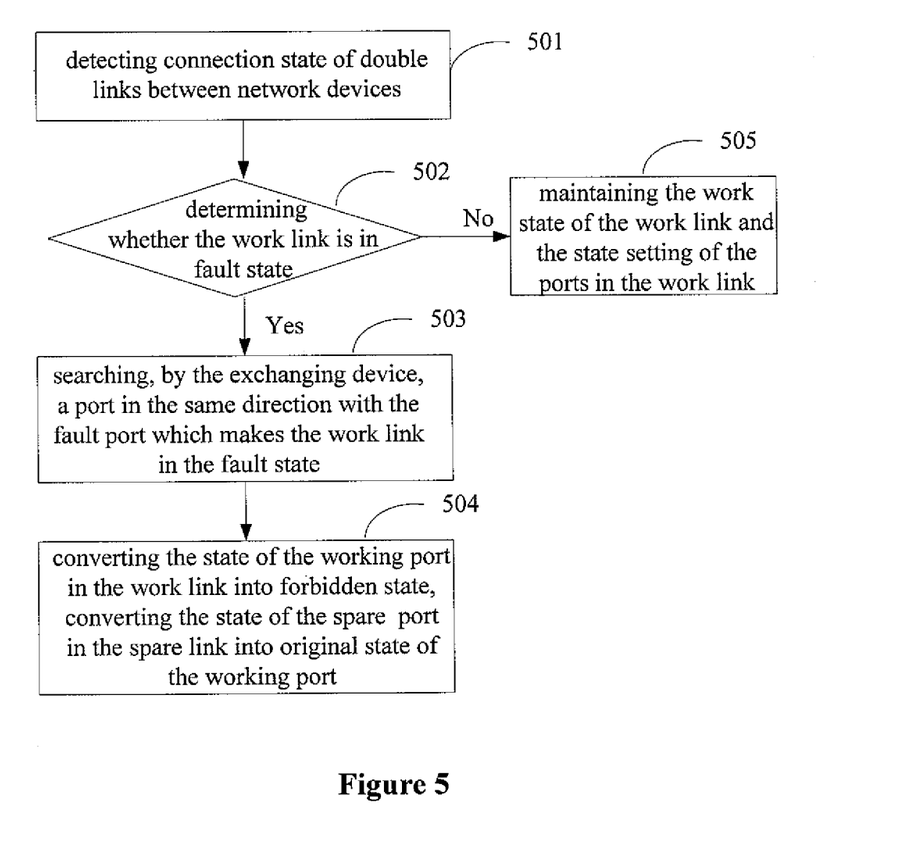
FIG. 5 is a flow chart of a fault processing method based on industry Ethernet network according to a second embodiment of the invention.

FIG. 5 illustrates a flow chart of a fault processing method based on industry Ethernet network according to a second embodiment of the invention, which is taken in conjunction with the schematic view of a double link structure of the exchanging device shown in FIG. 3. The embodiment illustrates a flow chart of a fault processing when a fault only occurs in the work link, and the spare link is in connection state in the network:

Step 501: detecting connection state of double links between network devices.

The exchanging device in the industry Ethernet network according to the invention performs redundant connection with adjacent exchanging device by an independent pair of ports in the same direction, wherein one port is a working port, the other port is a spare port, and all the exchanging devices are connected in sequence to form a double link structure in ring.

In this embodiment, when a fault occurs in the work link, the port in the link defines that the connection of the link is normal based on IEEE802.3 protocol, but data can not be exchanged with an adjacent exchanging device via this port since a fault occurred in the adjacent device; and the spare link is in connection state, and the port in the link defined that the connection of the link is normal based on IEEE802.3 protocol, and data can be exchanged with the adjacent exchanging device via this port normally.

Step 502: determining whether the work link is in fault state, if so, executing Step 503; otherwise, executing Step 505.

Step 503: searching, by the exchanging device, a port in the same direction with the fault port which makes the work link in the fault state.

Step 504: converting the state of the working port in the work link into forbidden state, converting the state of the spare port in the spare link into original state of the working port; and terminating the current procedure.

When the original state of the working port is forwarding state, the state of the spare port is converted into forwarding state; and when the original state of the working port is blocking state, the state of the spare port is converted into blocking state.

Step 505: maintaining the work state of the work link and the state setting of the ports in the work link; and terminating the current procedure.

Figure 6:
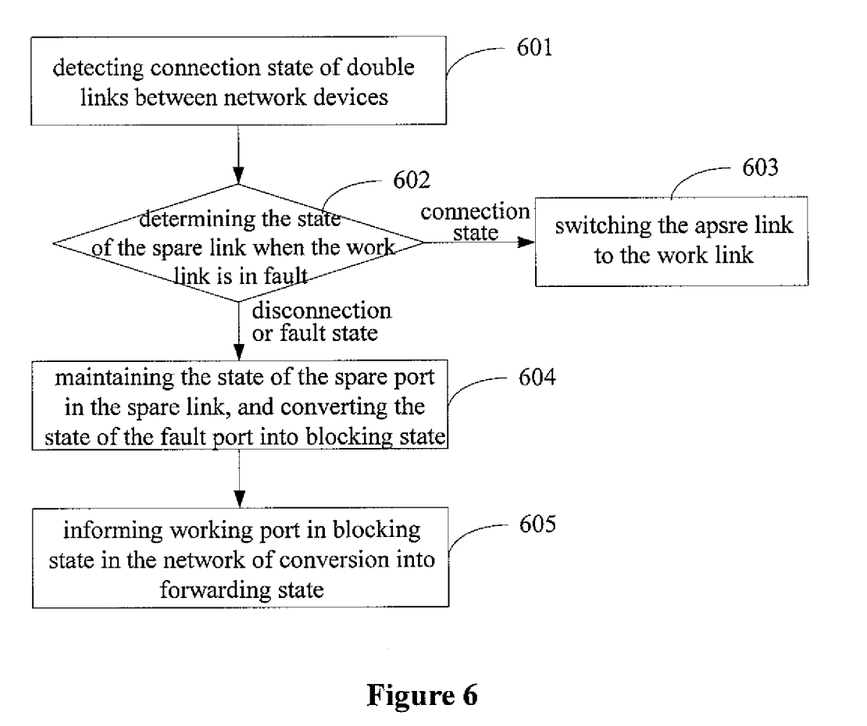
FIG. 6 is a flow chart of a fault processing method based on industry Ethernet network according to a third embodiment of the invention.

FIG. 6 illustrates a flow chart of a fault processing method based on industry Ethernet network according to a third embodiment of the of the invention, which is taken in conjunction with the schematic view of the double link structure of the exchanging device shown in FIG. 3. The embodiment illustrates a flow chart of a fault processing based on the state of the spare link when a fault occurs to the work link in the network.

Step 601: detecting connection state of double links between network devices.

When the spare link is in connection state, the connection of the link is normal, and data can be exchanged with the adjacent exchanging device via this port normally; when the spare link is in disconnection state, the connection of the link is in fault, and data can not be exchanged with other exchanging device via this port; when the spare link is in fault state, the connection of the link is normal, but data can not be exchanged with an adjacent exchanging device via this port since a fault occurred on the adjacent device.

Step 602: determining the state of the spare link when the work link is in fault, if the state thereof is in connection state, executing Step 603; if the state thereof is in disconnection or fault state, executing Step 604.

Step 603: switching the spare link to the work link; and terminating the current procedure.

the exchanging device searches a port in the same direction with the fault port which makes the work state in fault state, and converts the state of the working port in the work link into forbidden state and converts the state of the spare port in the spare link into the original state of the working port when the spare link comprising the port in the same direction is in connection state. That is, when the original state of the working port is forwarding state, the state of the spare port is converted into forwarding state; and when the original state of the working port is blocking state, the state of the spare port is converted into blocking state.

Step 604: maintaining the state of the spare port in the spare link, and converting the state of the fault port into blocking state.

When the link connection state of ports in the same direction of the exchanging device are all in disconnection state, the work state of the link is recovered by the exchanging device in the network through the connection recovery technique, that is, the exchanging device continuously detects whether the connection state of the port is normal, if it is detected that the connection state of one of the ports in the same direction of the exchanging device is normal, the exchanging device directly sets the port as forwarding state; otherwise, the detection will be continued; and if it is detected that the connection state of the other port in the same direction of the exchanging device is also normal, the exchanging device sets the port as forbidden state.

Step 605: informing working port in blocking state in the network of conversion into forwarding state, and terminating the current procedure.

Figure 7:
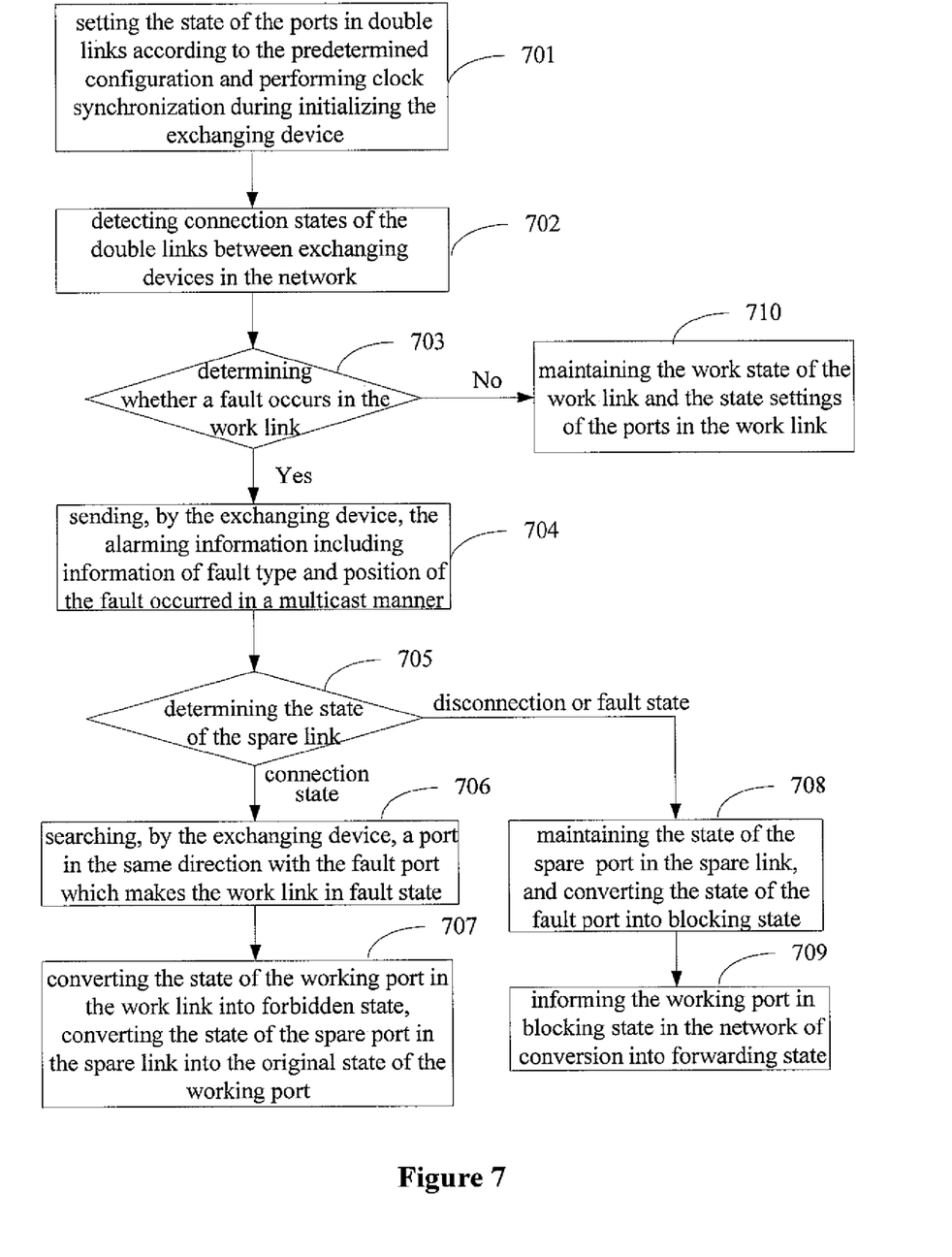
FIG. 7 is a flow chart of a fault processing method based on industry Ethernet network according to a fourth embodiment of the invention.

FIG. 7 illustrates a flow chart of a fault processing method based on industry Ethernet network according to a fourth embodiment of the invention, which is taken in conjunction with the schematic view of the double link structure of the exchanging device shown in FIG. 3. The embodiments illustrates a detailed flow chart of the fault processing method based on industry Ethernet network:

Step 701: setting the state of the ports in double links according to the predetermined configuration and performing clock synchronization during initializing the exchanging device.

Step 702: detecting the connection states of the double links between exchanging devices in the network.

Step 703: determining whether a fault occurs in the work link, if the fault occurs, executing Step 704; otherwise, executing Step 710.

Step 704: sending, by the exchanging device, the alarming information including information of fault type and position of the fault occurred in a multicast manner.

Step 705: determining the state of the spare link, if it is in connection state, executing Step 706; and if it is in fault or disconnection state, executing Step 708.

Step 706: searching, by the exchanging device, a port in the same direction with the fault port which makes the work link in fault state.

Step 707: converting the state of the working port in the work link into forbidden state, converting the state of the spare port in the spare link into the original state of the working port, and terminating the current procedure.

Step 708: maintaining the state of the spare port in the spare link, and converting the state of the fault port into blocking state.

Step 709: informing the working port in blocking state in the network of conversion into forwarding state, and terminating the current procedure.

Step 710: maintaining the work state of the work link and the state settings of the ports in the work link; and terminating the current procedure.

Corresponding to the fault processing method based on industry Ethernet network, the invention further provides a fault processing system based on industry Ethernet network.

Figure 8:
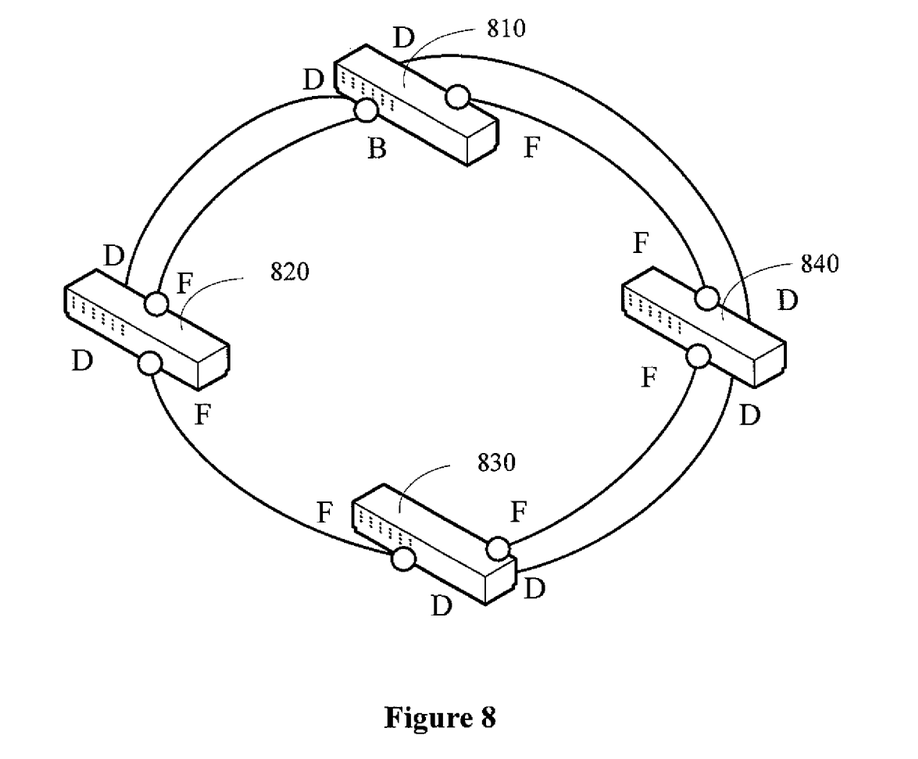
FIG. 8 is a schematic view of a structure of the fault processing system based on the industry Ethernet network according to the invention.

FIG. 8 illustrates a structurally schematic view of the fault processing system based on industry Ethernet network according to the invention. For illustrating conveniently, there are four exchanging devices illustrated in the schematic view, that is, an exchanging device 810, an exchanging device 820, an exchanging device 830 and an exchanging device 840. The four exchanging devices are connected by mutual redundant double links, the external ring is a work link in working state, and the internal ring is a spare link in spare state.

Each of the exchanging devices in the system includes a detection unit adapted to detect the connection states of the double links between adjacent exchanging devices; a switching unit adapted to switch the spare link to the work link when the work link is in fault state and the spare link is in connection state, wherein the switching unit further includes a searching unit adapted to search a port in the same direction with the fault port which makes the work link in fault state, an operation unit adapted to convert the state of the working port in the work link into forbidden state and convert the state of the spare port in the spare link into the original state of the working port when the spare link comprising the port in the same direction is in connection state.

Furthermore, the exchanging device may further include a converting unit adapted to maintain state of the spare ports in the link and convert the state of the fault port into blocking state when a fault occurs to both of the double links, or the work link is in fault state and the spare link is in disconnection state; an informing unit adapted to inform the working port in blocking state in the network of conversion into forwarding state; a setting unit adapted to set the state of the ports in the double link according to the predetermined configuration and perform clock synchronization during initializing the exchanging device in the network; and an alarming unit adapted to send the alarm information in the multicast manner when a fault occurs on the work link, wherein the alarming information includes information of fault type and position of the fault occurred.

Corresponding to the fault processing method and system based on industry Ethernet network, the invention further provides an exchanging device.

Figure 9:
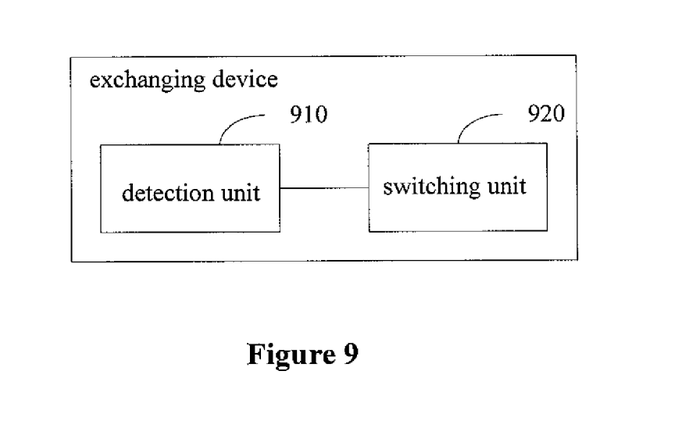
FIG. 9 is a block diagram of a exchanging device according to a first embodiment of the invention.

FIG. 9 illustrates a block diagram of an exchanging device according to a first embodiment of the invention.

The exchanging device includes a detection unit 910 and a switching unit 920.

The detection unit 910 is adapted to detect the connection states of the double links between the exchanging device connected thereto; and the switching unit 920 is adapted to switch the spare link to the work link when the work link is in fault state and the spare link is in connection state.

Figure 10:
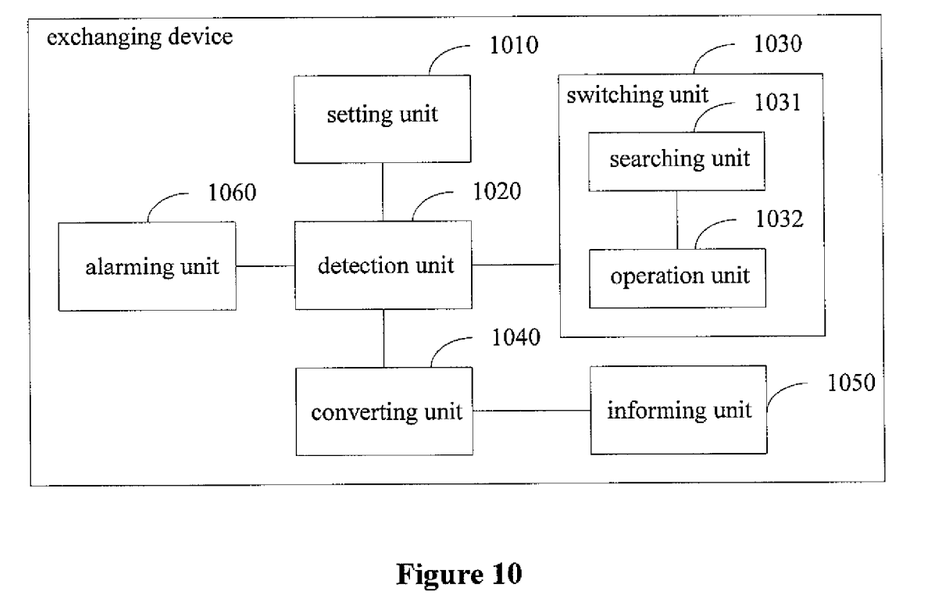
FIG. 10 is a block diagram of an exchanging device according to a second embodiment of the invention.

FIG. 10 illustrates an exchanging device according to a second embodiment of the invention.

The exchanging device includes: a setting unit 1010, a detecting unit 1020, a switching unit 1030, a converting unit 1040, an informing unit 1050 and an alarming unit 1060.

The setting unit 1010 is adapted to set the state of the ports in the double link according to the predetermined configuration and perform clock synchronization during initializing the exchanging device in the network; the detection unit 1020 is adapted to detect the connection states of the double links between the exchanging device connected thereto; and the switching unit 1020 is adapted to switch the spare link to the work link when the work link is in fault state and the spare link is in connection state; the converting unit 1040 is adapted to maintain state of the spare ports in the link and convert the state of the fault port into blocking state when a fault occurs on both of the double links, or when the work link is in fault state and the spare link is in disconnection state; an informing unit 1050 is adapted to inform the working port in blocking state in the network of conversion into forwarding state; and an alarming unit 1060 is adapted to send the alarm information in the multicast manner when a fault occurs on the work link, wherein the alarming information includes information of fault type and position of the fault occurred.

Wherein, the switching unit 1030 includes a searching unit 1031 adapted to search a port in the same direction with the fault port which makes the work link in fault state; and an operation unit 1032 adapted to convert the state of the working port in the work link into forbidden state and convert the state of the spare port in the spare link into original state of the working port when the spare link comprising the port in the same direction is in connection state.

As can be understood from the embodiments of the invention, the ring structure of mutual redundant double links according to the invention can ensure the network availability by switching to the spare link when multipoint faults appear in the network; and a re-direction time required by transmitting the normal data resulted from a change of the data transfer path during redundancy switching in a single ring network structure is avoided by switching in mutual redundant links, such that the time of fault recovery in the network is shortened.

Although the invention is described through embodiments, those ordinarily skilled in the art should appreciate that the invention has modifications and variations without departing from the spirit of the invention, and the appended claims are intended to include those modifications and variations without departing from the spirit of the invention.

What is claimed is:

1. A fault processing method based on industry Ethernet network comprising exchanging devices that are connected by mutually redundant double links, wherein a work link from the mutually redundant double links is in a working state and a spare link from the mutually redundant double links is in a spare state, the method comprising:
   detecting states of a connection of the mutually redundant double links between the exchanging devices in the network; and
   switching the spare link to the work link when the work link is in a fault state and the spare link is in a connection state, wherein:
   a state of a link from the mutually redundant double links comprises a state selected from the following: the connection state, the fault state and a disconnection state;
   each of the exchanging device includes at least four ports and connects to an adjacent exchanging device adjacent to the exchanging device via two ports of the four ports;
   two ports of the exchanging device in the same link are ports in the same ring;
   two ports of the exchanging device connected to the same adjacent exchanging device are ports in the same direction; and
   the switching of the spare link to the work link comprises:
      searching, by the exchanging device, a port in the same direction with a fault port which makes the work link in the fault state; and
      converting a state of a working port in the work link into a forbidden state and converting a state of a spare port in the spare link into an original state of the work link when the spare link comprising the port in the same direction is in a connection state.

2. The method according to claim 1, wherein the converting of the state of the spare port in the spare link to the original state of the working port comprises:
   when the original state of the working port is a forwarding state, converting the state of the spare port into the forwarding state; or
   when the original state of the working port is a blocking state, converting the state of the spare port into the blocking state.

3. The method according to claim 2, further comprising:
   during initialization of the exchanging device, setting all ports in the spare link in the forbidden state, setting one of all ports in the working link in a blocking state, and setting other ports of all ports in the working link in a forwarding state;
   maintaining, by the exchanging device, the state of the spare port in the spare link and converting the state of the fault port in the work link into the blocking state when a fault occurs to both of the double links or when the work link is in the fault state and the spare link is in the disconnection state; and informing the working port in the blocking state in the work link of the conversion into the forwarding state.

4. The method according to claim 1, further comprising:
setting a state of a port in the double links according to a configuration and performing clock synchronization when the exchanging device in the network is initialized.

5. The method according to claim 1, further comprising:
sending, by the exchanging device, alarm information in a multicast manner when a fault occurs to the work link, wherein the alarm information includes information of a fault type and a position of the fault occurred.

6. A fault processing system based on industry Ethernet network, comprising:
a plurality of exchanging devices connected by mutually redundant double links, wherein a work link from the mutually redundant double links is in a working state, the spare link from the mutually redundant double links is in a spare state, and at least one exchanging device of the plurality of exchanging devices comprises:
a detection unit adapted to detect connection states of double links from the mutually redundant double links between the at least one exchanging device and at least one second adjacent exchanging device adjacent to the exchanging device, wherein the state of a link from the mutually redundant double links comprises a state selected from the following: a connection state, a fault state and a disconnection state; and
a switching unit adapted to switch the spare link to the work link when the work link is in a fault state and the spare link is in a connection state; wherein:
each of the plurality of exchanging device comprises at least four ports, and connects to an adjacent exchanging device adjacent to the exchanging device via two ports of the four ports;
two ports of the exchanging device in the same link are ports in the same ring;
two ports of the exchanging device connected to the same adjacent exchanging device are ports in the same direction; and
the switching unit comprises:
a searching unit adapted to search a port in the same direction with a fault port which makes the work link in the fault state; and
an operation unit adapted to convert a state of a working port in the work link into a forbidden state and convert a state of a spare port in the spare link into an original state of the working port when the spare link comprising the port in the same direction is in the connection state.

7. The system according to claim 6, wherein the exchanging device further comprises:
a converting unit adapted to:
during initialization of the exchanging device, set all ports in the spare link in the forbidden state, set one of all ports in the working link in a blocking state, and set other ports of all ports in the working link in a forwarding state; and
maintain a state of the spare port in the spare link and convert the state of the fault port in the work link into blocking state when a fault occurs to both of the double links or when the work link is in fault state and the spare link is in disconnection state; and
an informing unit adapted to inform the working port in the blocking state in the work link of conversion into the forwarding state.

8. The system according to claim 6, wherein the exchanging device further comprises:
a setting unit adapted to set a state of ports in the double links according to a configuration and perform clock synchronization when the exchanging device in the network is initialized; and
an alarming unit adapted to send alarm information in a multicast manner when a fault occurs on the work link, wherein the alarm information includes information of a fault type and a position of the fault occurred.

9. An exchanging device, comprising:
a detection unit adapted to detect connection states of double links between the exchanging device and at least one second exchanging device connected to the exchanging device, wherein a state of a link from the mutually redundant double links comprises a state selected from the following: a connection state, a fault state and a disconnection state; and
a switching unit adapted to switch a spare link of the double links to a work link of the double links when the work link is in the fault state and the spare link is in the connection state;
wherein:
the exchanging device comprises at least four ports and connects to an adjacent exchanging device adjacent to the exchanging device via two ports of the four ports;
two ports of the exchanging device in the same link are ports in the same ring;
two ports of the exchanging device connected to the same exchanging device are ports in the same direction; and
the switching unit comprises:
a searching unit adapted to search a port in the same direction with a fault port which makes the work link in the fault state; and
an operation unit adapted to convert a state of a working port in the work link into a forbidden state and convert a state of a spare port in the spare link into an original state of the working port when the spare link comprising a port in the same direction is in the connection state.

10. The exchanging device according to claim 9, further comprising:
a converting unit adapted to,
during initialization of the exchanging device, set all ports in the spare link in the forbidden state, set one of all ports in the working link in a blocking state, and set other ports of all ports in the working link in a forwarding state; and
maintain the state of the spare port in the spare link and convert the state of the fault port in the work link into blocking state when a fault occurs to both of the double links or when the work link is in fault state and the spare link is in disconnection state;
an informing unit adapted to inform the working port in blocking state in the work link of conversion into a forwarding state.

11. The exchanging device according to claim 9, characterized by further comprising:
a setting unit adapted to set a state of ports in the double links according to a configuration and perform clock synchronization when the exchanging device in a network is initialized; and
an alarming unit adapted to send alarm information in a multicast manner when a fault occurs on the work link, wherein the alarm information includes information of a fault type and a position of the fault occurred.

12. The method according to claim 1, further comprising:
sending, by the exchanging device, alarm information in a multicast manner when a fault occurs to the work link, wherein the alarm information includes information of a fault type and a position of the fault occurred.

* * * * *